April 23, 1963   J. J. KERLEY, JR   3,086,600
MECHANICAL IMPULSE FILTER TYPE SHOCK MOUNT
Filed April 30, 1959
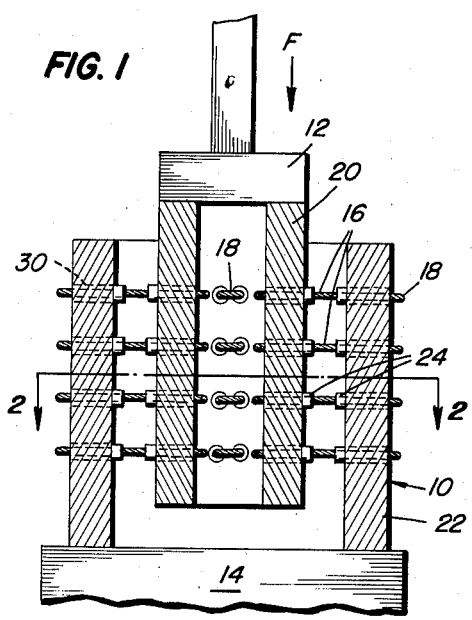
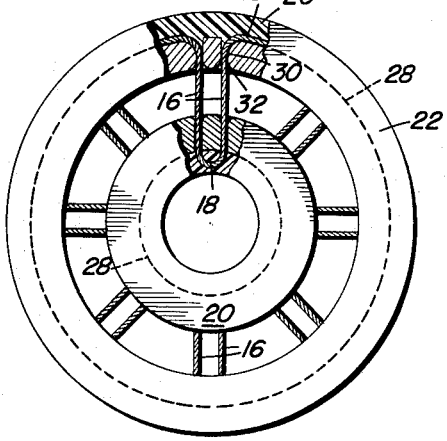
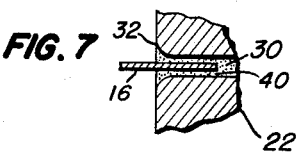
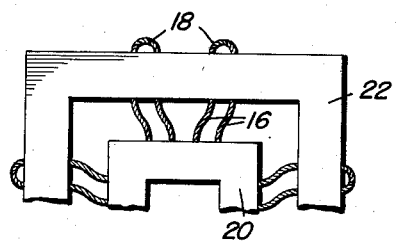
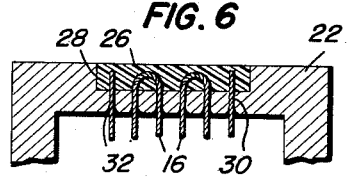
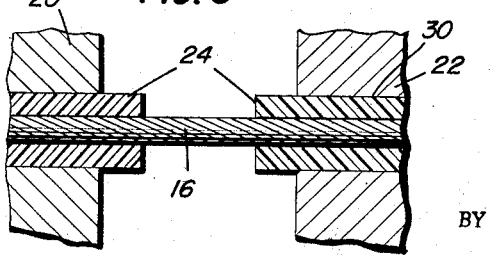
INVENTOR
James J. Kerley, Jr.
BY *Walter G. Finch*
ATTORNEY United States Patent Office 3,086,600
Patented Apr. 23, 1963

3,086,600
MECHANICAL IMPULSE FILTER TYPE
SHOCK MOUNT
James J. Kerley, Jr., Cheverly, Md., assignor to Kerley Engineering, Inc., Cheverly, Md., a corporation of Maryland
Filed Apr. 30, 1959, Ser. No. 809,968
8 Claims. (Cl. 175—155)

This invention relates generally to spring supports, and more particularly the invention pertains to mechanical impulse filter type shock mounts.

In the percussion type of machines, such as trip hammers, pile drivers, or wherever a sudden blow is developed, mechanical energy is transmitted with steep waveform. To prevent damage to the supporting structure and, and in the case of portable machine tools, to allow comfortable manual support and manipulation, the ram is cushioned by rubber or springs of the leaf or coil type. Because of the severe duty such application imposes, the service life is often short for the cushioning or spring element.

In many respects, the use of cables for shock isolation in severe service, such as for pile drivers, drop and air hammers, may be somewhat likened to the well-known employment of woven cable mats for explosion dampening. These mats permit fundamental movement or impulse without the transmittal of high frequency components.

It is an object of the present invention, therefore, to provide a mechanical impulse filter type shock mount for isolating step-function operating mechanical apparatus in the nature of pile drivers, drop hammers and percussion tools from their supports.

It is a further object of this invention to provide a motion transmitting machine member shock support mount which is capable of functioning under severe service with high reliability.

Still another object of this invention is to provide a shock mount of the mechanical impulses filter type which can be applied in high plurality in small space for supporting great loads.

Other objects of this invention are to provide shock mounts of mechanical impulse filter type which are economical to manufacture, efficient and reliable in operational use, which are easy to install and maintain, and finally which are compact and of light weight.

These and other objects and advantages of this invention will become more readily apparent and understood from the accompanying specification and single sheet of drawings in which:

FIG. 1 is a vertical center cross section view, partly in elevation, of a shock mount incorporating features of this invention;

FIG. 2 is a cross section taken along lines 2—2 of FIG. 1;

FIG. 3 is a longitudinal cross section of a resilient bushing showing the application thereof to the cables of the shock mount;

FIG. 4 is a top view of a circular type shock mount, partly broken away, to show the addition of cast-in resilient material;

FIG. 5 is a top view of a portion of a shock mount, illustrating the prestressing of the cables;

FIG. 6 is a horizontal cross section of a portion of a shock mount showing how cast resilient material can be applied to the outer structure of a shock mount; and FIG. 7 is a cross section of an aperture showing a form of shear relief for the resilient cable.

Referring now to FIGS. 1 and 2, there is illustrated generally a shock mount 10 of the mechanical impulse filter type for a ram 12 which applies a downward force or impulse F to an inner element 20 of rectangular, square, or elliptical or circular cross section.

Inner element 20 is intended to produce a blow directly, or by means of an intervening tool (not shown) against an anvil or material 14, such as stone, a pavement, or the head of a pile to be driven.

An outer element 22, which can also be of rectangular, square, elliptical or circular cross section supports and centers the inner element 20 by mean of a plurality of passes of a multi-strand resilient cable 16 which pass through apertures 30 provided therein.

The multi-strand resilient cables 16 may optionally be strengthened and reinforced against shear by means of resilient bushings 24, as best illustrated in FIG. 3.

In operation, inner element 20 of the shock mount 10 is forced downwardly, as shown by the force or impulse F, with the resilient cables 16 being sinusoidally distorted. At the same time, tension against each end loop 18 of a cable 16 causes it to shorten and supply additional length to those portions of cables 16 between he elements 20 and 22. Thus, a considerable excursion of inner element 20 of the shock mount 10 is available.

Where great weight must be supported, the end loops 18 of the cables 16 may be reinforced and aided in their restoring capacity by casting them in a resilient material 26 within grooves or recesses 28 provided in members 20 and 22, as shown in FIGS. 4 and 6.

FIGS. 4 and 6 also show the provision of reliefs 32, detailed in FIG. 7, for the edges of the cable apertures 30, which are especially useful in relieving cable shear in compact assemblies such as for handheld tools where no space is available for the previously mentioned resilient bushings 24. The ends of the cable portions may be cemented in bores 30 of member 22, as shown in FIGURE 7 by cement 40.

FIG. 5 illustrates a prestressing of resilient cables 16 in a filter having the configuration shown in FIGURES 1 and 2. The intentional distortion of the reeved cables 16 produces an additional internal strand friction which beneficially increases the damping of high frequency shock components.

While preferred embodiments of the invention have been shown and described, modifications may be made and it is intended in the appended claims to cover all such modifications as fall within the spirit and scope of the invention.

What is claimed is:

1. A mechanical impulse filter for driving impact means comprising a first tubular member, a second tubular member spaced from said first member, and positioned centrally therein with a terminal portion wholly within the first member to space the terminal portion from an object to be impacted, a plurality of means spaced longitudinally and circumferentially for connecting said tubular members together, each said means including a plurality of passes of multi-strand resident cable reeved back and forth through said tubular members so as to space and resiliently mount said tubular members from each other.

2. A mechanical impulse filter as recited in claim 1 wherein adjacent passes of each of the cables are connected together by continuous loop portions.

3. A mechanical impulse filter as recited in claim 2, and resilient means for reinforcing the loop portions of said cables.

4. A mechanical impulse filter as recited in claim 1, wherein said tubular members are of square cross section.

5. A mechanical impulse filter as recited in claim 1, wherein said tubular members are of circular cross section.

6. A mechanical impulse filter as recited in claim 1, wherein bushing elements are provided for said cable where it passes through said tubular members.

7. A mechanical impulse filter for driving impact means comprising a first tubular member, a second tubular member spaced from said first member, and positioned centrally therein with a terminal portion wholly within the first member to space the terminal portion from an object to be impacted, a plurality of resilient means spaced longitudinally and circumferentially for connecting said tubular members together, each said resilient means including multi-strand resilient cable elements connecting said members together in spaced relationship.

8. An arrangement as recited in claim 7, wherein said cables are spaced in alignment longitudinally as well as circumferentially between said tubular members for connecting said tubular members together.

References Cited in the file of this patent
UNITED STATES PATENTS

| | | |
|---|---|---|
| 960,746 | Warrington | June 7, 1910 |
| 1,657,387 | Goldschmidt | Jan. 24, 1928 |
| 1,786,136 | Stearman | Dec. 23, 1930 |
| 2,184,745 | Kinneman | Dec. 26, 1939 |
| 2,415,983 | Yerzley | Feb. 18, 1947 |
| 2,481,029 | Lindsay | Sept. 6, 1949 |
| 2,873,109 | Hartenstein et al. | Feb. 10, 1959 |